United States Patent [19]
Mori et al.

[11] 3,960,024
[45] June 1, 1976

[54] APPARATUS FOR DRIVING DETACHING ROLLERS IN TEXTILE COMBING MACHINES

[75] Inventors: Mitsuo Mori, Toyota; Kengo Ohashi, Takahama, both of Japan

[73] Assignee: Kabushiki Kaisha Toyoda Jidoshokki Seisakusho, Tokyo, Japan

[22] Filed: July 9, 1975

[21] Appl. No.: 594,513

[30] Foreign Application Priority Data
July 13, 1974 Japan............................ 49-079737

[52] U.S. Cl........................................ 74/52; 74/25; 74/394
[51] Int. Cl.² ................. F16H 37/12; F16H 21/16; F16H 35/02
[58] Field of Search .............. 74/25, 27, 52, 84, 394

[56] References Cited
UNITED STATES PATENTS

| | | | |
|---|---|---|---|
| 3,608,391 | 9/1971 | Bargstedt et al.................. | 74/52 X |
| 3,625,147 | 12/1971 | Rubenstein........................ | 74/25 X |
| 3,857,292 | 12/1974 | Brems................................ | 74/52 |

Primary Examiner—Leonard H. Gerin
Attorney, Agent, or Firm—Burgess, Ryan and Wayne

[57] ABSTRACT

Apparatus for driving detaching rollers in textile combing machines. The pilgrim step motion cycle of the detaching rollers is created by the combination of a constant rotational motion, transmitted by a driving source by way of a power transmission mechanism involving a differential gear mechanism, and a modified variable rotational motion cycle, transmitted by the differential gear mechanism. In the mechanism for creating the above-mentioned variable rotational motion, a first link motion mechanism, which is actuated by the driving source, creates a basic variable rotational motion cycle; and a second link motion mechanism, which is actuated by the output of the first link motion mechanism, adjusts the characteristic feature of the basic variable rotational motion cycle. The output of the second link motion mechanism is imparted to the differential gear mechanism as the modified variable rotational motion cycle.

9 Claims, 16 Drawing Figures

APPARATUS FOR DRIVING DETACHING ROLLERS IN TEXTILE COMBING MACHINES

SUMMARY OF THE INVENTION

The present invention relates to an apparatus for driving detaching rollers in textile combing machines and; more particularly, relates to an apparatus for driving detaching rollers in so-called high speed combing machines.

In a combing machine, the detaching rollers rotate forwardly or backwardly. In the forward rotation of the detaching rollers, the layer of fibers which have been combed by a combing cylinder is displaced forwardly. On the other hand the combed layer of fibers is displaced backwardly by the backward rotation of the detaching rollers. A combing action of one cycle is carried out as follows. A leading end portion of the layer of fibers is combed by the combing cylinder, while a rear end portion thereof is gripped by a nipper; thereafter, the combed layer of fibers is displaced toward the detaching rollers by the forward motion of a nipper, the detaching rollers are rotated backwardly so that the combed layer of fibers of the previous combing cycle is displaced backwardly during the above-mentioned forward motion of the nipper and a rear end portion of the combed layer of fibers of the previous combing cycle is placed on the leading end portion of the layer of fibers of the present combing cycle; next, the layer of fibers of the present combing cycle is transferred from the nipper to the detaching roller by the forward rotation of the detaching rollers and the rear end portion of the layer of fibers of the present combing cycle is combed by a top comb of the combing machine during the above-mentioned transfer motion of the layer of fibers from the nipper to the detaching rollers. The above-mentioned combing cycle is continuously repeated during the combing operation.

It is well-known that, in the above-mentioned combing operation, the combing action by the combing cylinder is imparted to a layer of fibers gripped by the nipper during a period of half rotation of a shaft of the combing cylinder, and the detaching roller is stopped or rotated forwardly at very slow speed during the above-mentioned period. Further, the forward or backward rotation of the detaching roller, is carried out during a period of the other half rotation of the shaft of the combing cylinder.

The above-mentioned forward and backward rotations of the detaching roller, which is hereinafter referred to as a pilgrim step movement, are created by the following system. A differential gear mechanism is mounted on a common input shaft of the detaching rollers, and; inputs of uniform rotary motion and variable rotary motion are imparted to the differential gear mechanism so that the output of the differential gear mechanism created by the combination of the above-mentioned inputs is transmitted to the common input shaft of the detaching rollers and; thereby, the pilgrim step movement of the detaching rollers is created.

In the conventional combing machines, a cam mechanism is mostly utilized to create the above-mentioned variable rotary motion. However, since it is the latest tendency to rotate the combing machines at high speed, it has been found that the above-mentioned cam mechanism is not applicable. This is because of the creation of loud noise, due to the impact of a cam ball against the cam at the time of changing the rotation of the detaching rollers from backward to forward; of mechanical damage such as abrasion of the cam surface, and; of insufficient ability to follow the high speed driving of the combing cylinder.

To eliminate the above-mentioned drawback of the conventional combing machines, the U.S. Pat. No. 3,584,346 provides a unique link motion mechanism for imparting the input of the variable rotation motion to the differential gear mechanism characterized by a control system provided with an eccentric freely mounted on the shaft of the combing cylinder and related link motion mechanism to impart a reciprocating movement to one of the input shafts of the differential gear mechanism. However, since the above-mentioned eccentric controls the timing of the above-mentioned variable rotation motion, the characteristic feature of the rotational motion of the detaching rollers directly depends upon the above-mentioned link motion mechanism. (Consequently, the motion of the detaching rollers created by the above-mentioned link motion mechanism can not be fully satisfactory for carrying out the high speed combing operation.)

According to our experience, if the combing machine is driven at a higher speed in comparison with the conventional combing machine, the forward carrying speed of the layer of fibers by the detaching roller, after the backward rotation thereof, becomes high. As a result, there is the possibility of the fiber arrangement of the leading end portion of the combed layer of fibers being dishevelled. To eliminate the above-mentionoed trouble, it is useful to adjust the rotation cycle of the detaching roller so as to fix the speed ratio between the forward rotation and the backward rotation of the detaching rollers as large as possible. It is preferable to adjust the operational condition such as the distance of forward motion or rearward motion of the fiber layer by the detaching roller so as to correspond to the motions of the other mechanisms when the fiber material is changed. However, in the above-mentioned U.S. Patent, such adjustment is very difficult to carry out.

The principle object of the present invention is to provide a unique apparatus for driving detaching rollers in the high speed combing machine by which the above-mentioned drawbacks of the known combing machines can be perfectly eliminated.

To attain the above-mentioned purpose, in the present invention, variation of the rotation motion, imparted to the differential motion mechanism, is created by, firstly, forming a basic motion cycle and, secondly, generating a modified motion cycle which sets a predetermined condition of the combing operation. That is, a basic motion cycle is created, for transmission to the differential gear mechanism, which corresponds to a motion cycle of the detaching rollers comprising the forward and rearward rotation and stopping of the rotation of the detaching rollers during one complete rotation of the combing cylinder. This basic motion cycle is created by the input of a uniform driving motion transmitted by a driving source by way of some link motion mechanism. Next the above-mentioned modified motion cycle is generated from the basic motion cycle by adjusting the characteristic feature of the basic motion cycle so as to correspond to a desired motion cycle. The above-mentioned modified variable rotation motion cycle is imparted to the differential motion mechanism and combined with the uniform rotation transmitted by the shaft of the combing cylinder so that a desirable motion cycle of the detaching roller can be created. The above-mentioned basic motion cycle is created by a first link motion mechanism provided with an eccentric rotatably mounted on the shaft of the combing cylinder, and the basic motion cycle thus created is modified by a second link motion mechanism provided with a rocking link motion mechanism.

DETAILED EXPLANATION OF THE INVENTION

Figure 1:
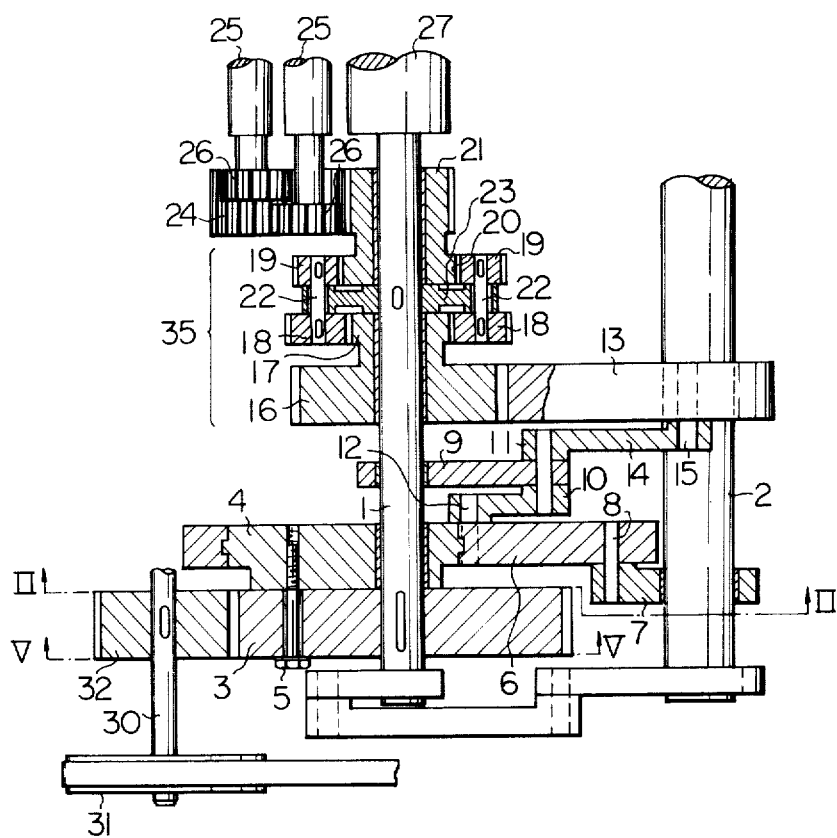
FIG. 1 is a sectional view of the apparatus for driving detaching rollers in textile combing machines according to the present invention.
Figure 2:
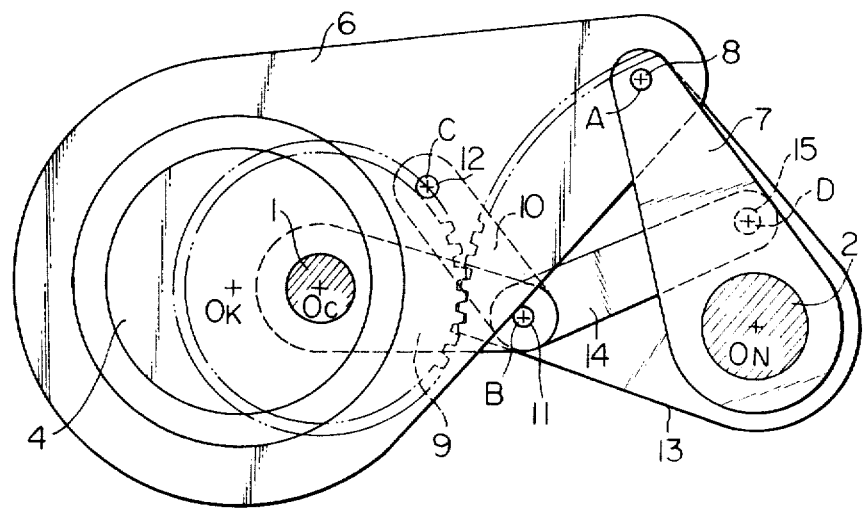
FIG. 2 is a sectional side view of the driving apparatus, taken on line II—II in FIG. 1.

Referring to FIGS. 1 and 2, a driving shaft 30, a shaft 1 of a combing cylinder 27 and a rotation shaft 2 are disposed to a machine frame (not shown) in parallel condition. The driving shaft 30 is driven by a driving source (not shown) through a V shaped pulley 31 at a constant angular velocity. The above-mentioned rotation of the shaft 30 is transmitted to a gear 3, which is rigidly secured to the shaft 1 by a key (not shown), by way of a gear 32 which meshes with the gear 3, so that the shaft 1 is driven at a constant angular velocity. An eccentric 4 is rotatably mounted on the shaft 1 and the eccentric 4 is secured to the gear 3 by a bolt 5, so that the eccentric 4 is capable of rotating about the shaft 1 with a constant angular velocity. A rocking arm 6 is turnably mounted on the eccentric 4 and a free end portion thereof is pivoted to an end of a supporting lever 7 turnably mounted on the shaft 2 by a pivot pin 8. Consequently, when the eccentric 4 is rotated according to the rotation of the gear 3, the rocking arm 6 swings while the free movement of the end portion thereof is restricted. A base portion of a control lever 9 is turnably mounted on the shaft 1 and the free end portion thereof is pivotally connected to an end portion of a connecting link 10 by a pivot pin 11, while the other end portion of the connecting link 10 is pivotally connected to the rocking arm 6 by a pivot pin 12. Consequently, the motion of the rocking arm 6 is transmitted to the control lever 9 via the connecting link 10. A base portion of a sector wheel 13 is turnably mounted on the shaft 2, and the sector wheel 13 is connected to an end portion of an intermediate link 14 by a pivot pin 15 while the other end portion of the link 14 is connected to a free end portion of the control lever 9 by a pivot pin 11. The axial centers of these pivot pins 11 and 15 are represented by B and D in FIG. 2, while the axial center of the pivot pin 8 is represented by A in the same figure. Consequently, the motion of the control lever 9 is transmitted to the sector wheel 13 via the intermediate link 14 so that the sector wheel 13 swings about the shaft 2. A sun gear 16 of a differential gear mechanism 35 is rotatably mounted on the shaft 1 and meshes with the sector wheel 13. Therefore, the swing motion of the sector wheel 13 is transmitted to the sun gear 16. The differential gear mechanism 35 comprises: the sun gear 16 and another sun gear 17 which is formed with the sun gear 16 as one body; a pair of sun gears 20 and 21 which are formed as one body and rotatably mounted on the shaft 1; an arm 23 whith is rigidly mounted on the shaft 1 by a key (not shown) at a position between the sun gears 17 and 20; planetary gears 18 and 19 which are rigidly mounted on the respective shafts 22 rotatably supported by the arm 23 in such a condition that the planetary gears 18 mesh with the sun gear 17, while the planetary gears 19 mesh with the sun gear 20. A pair of detaching rollers 25 are provided with respective gears 26 mounted at free end portion thereof and these gears 26 mesh with a gear 24 which is directly driven by the sun gear 21.

As a result of the above described construction, when the shaft 1 of the combing cylinder 27 is driven, the arm 23 is turned together with the shaft 1 and, consequently, the planetary gears 18 and 19 turn about the sun gears 17 and 20, respectively, while meshing with these sun gears 17 and 20 respectively. According to the above-mentioned gearing motion, the sun gear 20 is driven and the gear 24 is therefore driven at the constant angular velocity. The above-mentioned uniform driving motion is transmitted to the detaching rollers 25 by way of the gears 26, respectively. This uniform driving motion is hereinafter referred to as an uniform motion of the differential gear mechanism 35. However, since the swing motion of the sector wheel 13 is transmitted to the sun gear 16, the reciprocal turning motion of the sun gear 16 generates a reciprocating turning motion of the sun gear 16. This reciprocating turning motion of the sun gear 16 creates an input of a variable motion cycle into the differential gear mechanism 35 and, consequently, the input of the variable motion cycle is superimposed upon the uniform driving motion of the differential gear mechanism 35 so that a desirable motion cycle of the detaching rollers 25 can be created.

The above-mentioned driving apparatus works as hereinafter explained in detail. That is, when the shaft 30 is driven by the driving source (not shown) via the V shaped pulley 31, the shaft 1 of the combing cylinder 27 is driven by way of the gearing mechanism comprising the gears 32 and 3. The rotation of the shaft 1 is transmitted to the detaching rollers through the differential gear mechanism 35 which reduces the angular velocity of the rotating shaft 1 so that the detaching rollers 25, 25 are rotated at an identical slow angular velocity. On the other hand, the eccentric 4 is rotated about the central axis of the shaft 1 together with the gear 3 and, consequently, the rocking arm 6 reciprocally moves about the shaft 1 in such a way that the free movement of the end portion thereof is restricted by the supporting lever 7. Therefore, the eccentric 4, the rocking arm 6 and the supporting lever 7 form a link motion mechanism which is hereinafter referred to as a first link motion mechanism.

Figure 3:
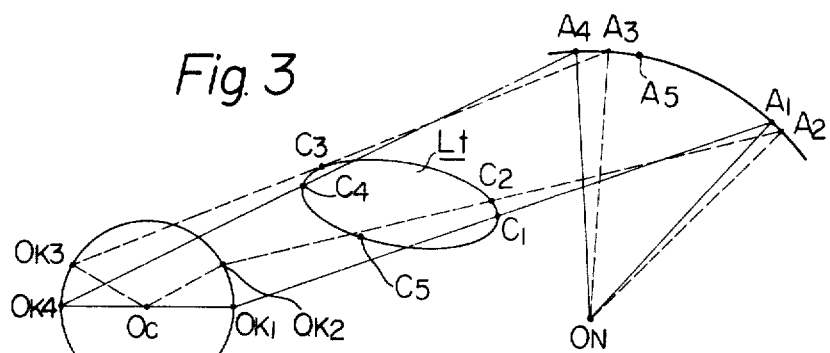
FIG. 3 is a diagramatic illustration of the mechanism for creating the basic motion cycle in the apparatus shown in FIG. 1.
Figure 4:
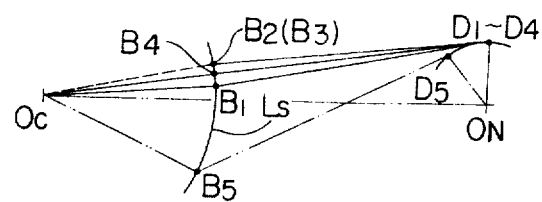
FIG. 4 is a diagramatic illustration of the mechanism for generating the modified motion cycle in the apparatus shown in FIG. 1.

The motion of the first link motion mechanism is diagramatically shown in FIG. 3. In FIG. 3, OC, ON and OK represent the axial centers of the shafts 1, 2 and the eccentric 4, respectively. Provided that C represents a point on a straight line connecting the points OK and A the point C moves along an elliptical locus $L_t$. In this example, the point C is positioned at almost a middle position between the points OK and A. When the shaft 1 is driven at the constant angular velocity, the eccentric 4 turns about the shaft 1 at the same constant angular velocity as the shaft 1. However, since the central axis OK of the eccentric 4 turns about the central axis OC of the shaft 1 as shown in FIG. 3, the central axis A of the pivot pin 8, which connects the rocking arm 6 and the supporting lever 7, reciprocally moves along a circular arc $\overarc{A_2A_4}$ having a center on the axial center ON of the shaft 2. For easy understanding the function of the driving apparatus according to the present invention, the motion of the components of the apparatus is explained two dimentionally. As clearly shown in FIG. 3, when the point OK moves about the central point OC at a constant angular velocity along the circle $OK_1$, $OK_2$, $OK_3$, $OK_4$, and $OK_5$, the point A reciprocally moves along the circular arc $\overarc{A_2A_4}$ in such cycle from $A_1$ to $A_1$ via points $A_2$, $A_3$, $A_4$ and $A_5$, while the point C moves along the elliptical locus $L_t$ from a point $C_1$ to $C_1$ via points $C_2$, $C_3$, $C_4$ and $C_5$. The elliptical locus $L_t$ is provided with a portion $\overarc{C_2C_3}$ having an identical radius of curvature. Now, referring back to FIG. 2, if the axial center of the pivot pin 12 coincides with the above-mentioned point C, while the axial center B of the pivot pin 11 coincides with the center of the portion $\overarc{C_2C_3}$ of the elliptical locus $L_t$, the distance between the pivot shafts 11 and 12 coincides with the above-mentioned radius of curvature. Consequently, when the point C moves from the point $C_2$ to the point $C_3$, the control lever 9 is held stationary. On the other hand, since the portion $C_3C_4C_5C_1$ of the elliptical locus $L_t$ consists of portions having different radius of curvature, when the point C moves along the points $C_3$, $C_4$, $C_5$, $C_1$ and $C_2$, the control lever 9 swings about the shaft 1 in accordance with the displacement of the connecting link 10. That is, as shown in FIGS. 3 and 4, when the point C moves along the elliptical locus from the point $C_3$ to the point $C_2$ via the points $C_4$, $C_5$ and $C_1$, the point B moves along a portion of a circular locus $\overarc{B_2B_5}$ which is defined by the swing motion of the control lever 9. Points $B_1$, $B_2$, $B_3$, $B_4$ and $B_5$ correspond to the points $C_1$, $C_2$, $C_3$, $C_4$ and $C_5$, respectively. As is clear from FIG. 4, since the control lever 9 is held stationary when the point C moves from the point $C_2$ to the point $C_3$, the point $B_2$ overlaps the point $B_3$. In the relative disposition of the points $O_c$ and ON shown in FIG. 4, if the points $O_c$ and ON are connected by a straight line $\overline{O_cON}$, the transversal positions of the points $B_1$, $B_2$, $B_3$ and $B_4$ to the line $\overline{O_cON}$ vary a little but the projected positions of points $B_1$, $B_2$, $B_3$ and $B_4$ on the line $\overline{O_cON}$ almost coincide. Therefore, when a circular arc having a radius identical to the distance between the points B and D (in FIG. 2) is drawn at each point $B_1$ ($B_2$, $B_3$, $B_4$) in FIG. 4, the crossing point of each combination of two circular arcs concentrates at an identical point represented by $D_1$ to $D_4$ in FIG. 4. Therefore, if the axial center D of the pivot pin 15 is fixed at a position corresponding to the above-mentioned point represented by $D_1$ to $D_4$ in FIG. 4, even though the pivot pin 11 is displaced along the circular locus $B_1$, $B_2$, $B_3$ and $B_4$, the point $D_1$ that is the pivot shaft 15, does not move and, therefore, the sector wheel 13 does not move during this period of time. That is, when the eccentric center OK of the eccentric 4 turns about the shaft 1 from the point $OK_1$ to $OK_4$, the axial center C of the pivot shaft 12 moves from the point $C_1$ to the point $C_4$ of the elliptical locus $L_t$ and the axial center B of the pivot shaft 11 is displaced from the point $B_1$ to the point $B_4$ by the link motion of the connecting link 10 and the control lever 9. However, the axial center D of the pivot shaft 15 is held stationary and, consequently, the sector wheel 13 does not move during the above-mentioned period of time. During the above-mentioned period of time, the pint of OK turns about the central point $O_c$ about 180° that is, the shaft 1 of the combing cylinder 27 turns about 180°, however, during this period, the sector wheel 13 and the sun gear 16 don't move.

As shown in FIG. 4, the transversal position of the point $B_5$, which correspond to the point $OK_5$ in FIG. 3, to the line $\overline{O_cON}$ varies from that of the point $B_1$, while the projected position of the point $B_5$ on the line $\overline{O_cON}$ also varies from that of the point $B_1$. Therefore, when the pivot shaft 11 moves downward from the point $B_1$ to the point $B_5$, the point D is displaced from the point $D_4$ to a point $D_5$, and; when the pivot shaft 11 moves upward from the point $B_5$ to the point $B_1$, the point D is displaced from the point $D_5$ to the point $D_4$, as shown in FIG. 4. Consequently, the sector wheel 13 is turned counterclockwise when the control lever 9 turns clockwise (in FIG. 2) from the point $B_1$ to the point $B_5$ (in FIG. 4), while the sector wheel 13 is turned clockwise when the control lever 9 turns counterclockwise (in FIG. 2) from the point $B_5$ to the point $B_1$ (in FIG. 4). The above-mentioned reciprocating swing motion of the sector wheel 13 is transmitted to the sun gear 16 so that the sun gear 16 rotates in two directions reciprocally. The above-mentioned reciprocal swing motion of the sector wheel 13 is carried out during a period of the other half turning motion of the shaft 1. The motion of the sector wheel 13 during the displacement of the pivot shaft 11 from the point $B_4$ to the point $B_5$, which corresponds to the motion of the point OK from the point $OK_4$ to the point $OK_5$, creates the input of the differential gear mechanism 35 from rearward motion of the detaching rollers 25; while the motion of the sector wheel 13 during the displacement of the pivot shaft 11 from the point $B_5$ to the point $B_1$, which corresponds to the motion of the point OK from the point OK to the point $OK_1$, creates the input of the differencial gear mechanism 35 from forward motion of the detaching rollers 25.

Figure 6:
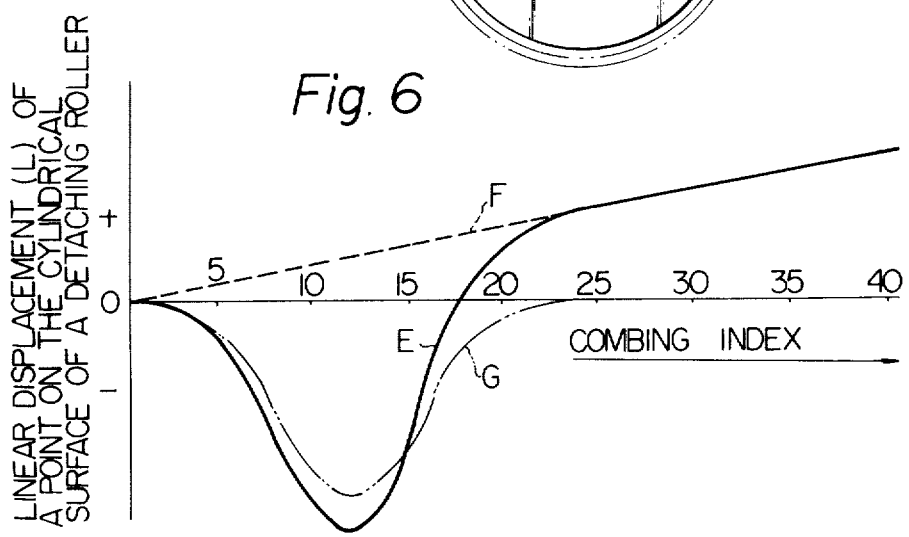
FIG. 6 is a diagramatic illustration of the motion cycle showing the linear displacement of a point on the cylindrical surface of a detaching roller in relation to the combing index, according to the present invention.
Figure 7:
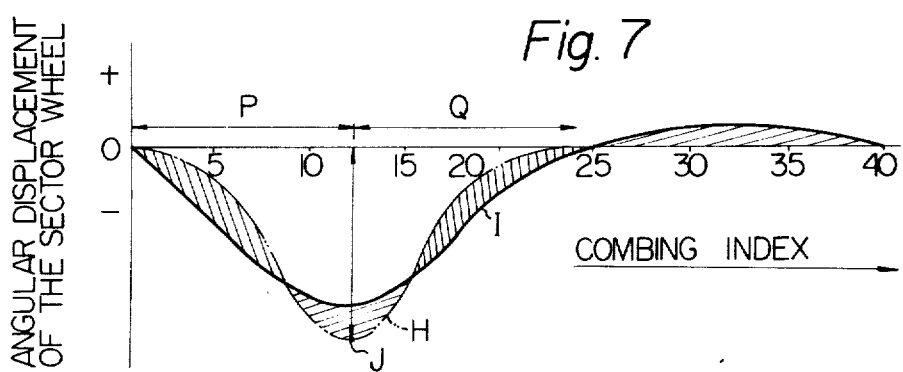
FIG. 7 is a diagramatic illustration of the basic motion cycle of the angular displacement of the sector wheel in relation to the combing index, according to the present invention.

The above-mentioned control lever 9, the intermediate link 14 and the sector wheel 13 form a second link motion mechanism which is actuated by the first link motion mechanism and changes the characteristic feature of the basic motion cycle created by the first link motion mechanism. This modified motion cycle is imparted to the differential gear mechanism 35. As shown in FIG. 6, the relation between the linear displacement of a point on the cylindrical surface of each one of the detaching rollers 25, which corresponds to the displacement of the layer of fibers by the detaching rollers 25 in one cycle of the combing operation, and the combing index which corresponds to one complete rotation of the combing cylinder 27, is generally represented by a cycle line E. This cycle line E can be made by superimposing the motion cycle represented by a linear line F and the motion cycle represented by a cycle line G, wherein line F indicates the rotation having a constant angular velocity created by the shaft 1, the arm lever 23, the gear 19, the sun gear 21 and the gears 24 and 26, while line G indicates the variable rotation created by a suitable mechanism, the differential gear mechanism 35 and the gears 24 and 26. The basic motion cycle created by the first link motion mechanism is represented by a motion cycle I in FIG. 7. This motion cycle I is modified to a motion cycle H in FIG. 7 by the second link motion mechanism comprising the control lever 9, the intermediate link 14 and the sector wheel 13. As seen in FIG. 7, the portions represented by hatching are reduced from or added to the motion cycle I so that the desired motion cycle of the angular displacement of the sector wheel 13 can be created. This modified motion cycle H represents uneven speed of the angular displacement of the sector wheel 13 about the shaft 2 toward the clockwise and counterclockwise directions. Further, this modified motion cycle H is imparted to the sun gear 16 of the differential gear mechanism 35 so that the motion cycle G shown in FIG. 6 is created.

The above-mentioned modified motion cycle H can be changed by changing the size of the area of the portions represented by hatching, and also changing the position of an inflection point J of the motion cycle H along the ordinate or along the abscissa in FIG. 7. In FIG. 7, the position of the inflection point J along the abscissa is represented by P, while P+Q represents the abscissa where the motion cycle line H crosses the zero line of the ordinate. The above-mentioned changing can be attained by changing the length of the intermediate link 14 and/or the distance between the central axis of the pivot pin 15 and the central axis of the shaft 2. For the purpose of changing the effective length of the intermediate link 14, and/or changing the mounting position of the pivot shaft 15, several modification of the driving apparatus can be applied as hereinafter illustrated.

Figure 8:
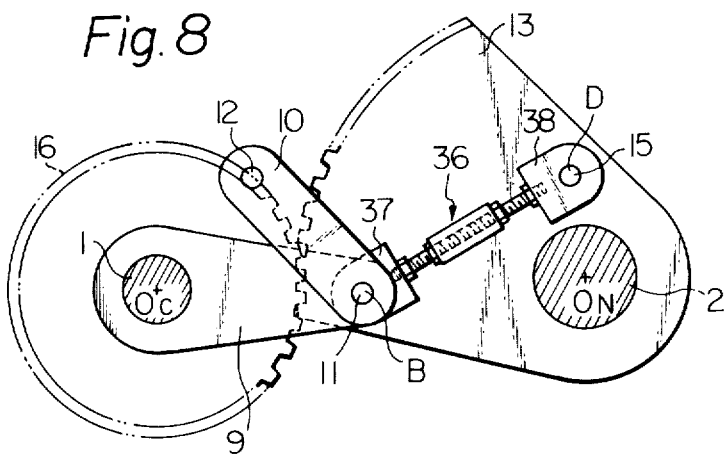
FIG. 8 is a side view of a modified mechanism for creating the second motion cycle of the sector wheel according to the present invention.

Referring to FIG. 8, a length-adjustable link is applied instead of the intermediate link 14. That is, a turn buckle 36 is rigidly connected to a bracket 37 at an end thereof and the bracket 37 is turnably mounted on the pivot shaft 11. The other end of the turn buckle 36 is rigidly connected to a bracket 38 which is turnably mounted on the pivot shaft 15. Therefore, the effective length of the turn buckle 36 between the central axis B and D of the respective pivot shafts 11 and 15 can be easily changed by operating the turn buckle 36.

Figure 9:
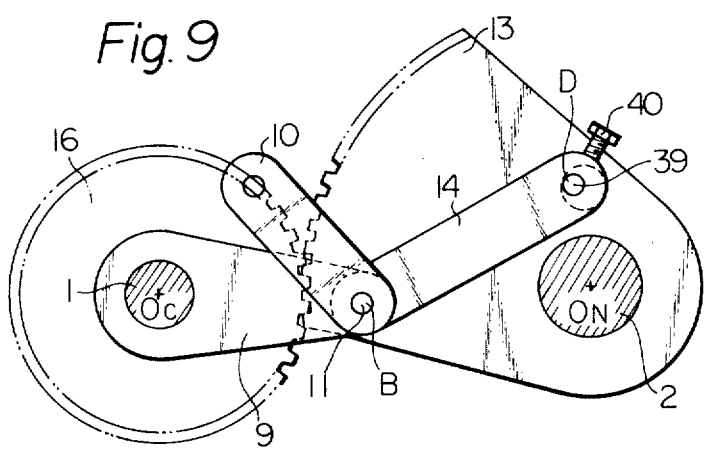
FIG. 9 is a side view of a further modified mechanism for creating the second motion cycle of the sector wheel according to the present invention.
Figure 10:
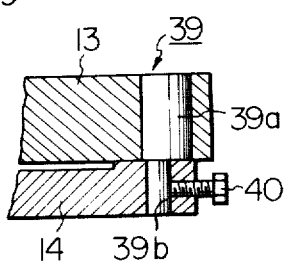
FIG. 10 is a section view of a portion of the mechanism shown in FIG. 9.

In the embodiment shown in FIGS. 9 and 10, wherein an eccentric pivot shaft 39 is utilized instead of the pivot shaft 15 of the first embodiment shown in FIG. 1, the pivot shaft 39 comprises a portion 39a which turnably supports the sector wheel 13 and an eccentric portion 39b which is rigidly connected to the intermediate link 14 by a fastening bolt 40. Since the axial center of the portion 39b is biased from the axial center of the portion 36a, the effective distance between the axial center B of the pivot shaft 11 and the axial center D of the portion 39a of the eccentric pivot shaft 39, and the distance between B and the axial center of the shaft 2 can be easily changed by changing the angular fastening position of the portion 39b of the eccentric pivot shaft 39 by the bolt 40.

As mentioned above, the second link motion mechanism utilized for the present invention modifies the basic motion cycle created by the first link motion mechanism. Consequently the connecting link 10 having an effective length which does not strictly coincide with the radius of curvature of the portion $\overline{C_2C_3}$ of the elliptical locus $L_t$ (FIG. 3) may be used, if the effective length is approximately the same as the above-mentioned radius of curvature.

Referring to FIG. 1, when the output of the second link motion mechanism for rotating the sun gear 16 toward a rotating direction which is opposite to the rotating direction of the shaft 1 is imparted to the differential gear mechanism 35, the differential gear mechanism 35 works to superimpose the output of the sun gear 16 and the output of the arm 23 which is rotated together with the shaft 1 so that the detaching rollers 25 are rotated rearwardly. Next, the output of the second link motion mechanism for rotating the sun gear 16 toward a rotating direction of the shaft 1 is imparted to the differential gear mechanism 35, the output of the sun gear 16 is superimposed with the output of the arm 23 so that the detaching rollers 25 are rotated forwardly. According to the above-mentioned rearward rotation of the detaching rollers 25, the tail end portion of a combed layer of fibers combed in a previous combing cycle is placed on a leading end of the layer of fibers held by the nipper and, thus, the connected layer of fibers is displaced forward by the above-mentioned forward motion of the detaching rollers 25. After completion of the above-mentioned forward and rearward motion of the detaching rollers 25, since the sector wheel 13 does not move, that is, the differential gear mechanism 35 does not receive any input from the second link motion mechanism and only receives the input from the arm 23 which is rotated together with the shaft 1 at the constant angular velocity, the detaching rollers 25 are rotated at a very slow angular velocity. This angular velocity may be selected to be very small so that the rotation of the detaching rollers 25 may be understood as negligibly small. During the above-mentioned period, the combing action by the combing cylinder 27 on the successive layer of fibers is carried out.

Figure 5:
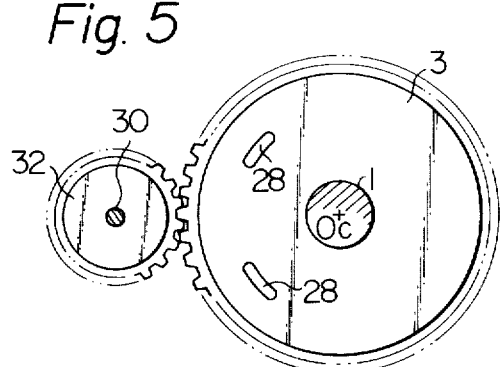
FIG. 5 is a sectional view of the driving apparatus, taken on line V—V, in FIG. 1.

Referring to FIG. 1, and FIG. 5 to adjust the relative motion between the combing cylinder 27 and the detaching rollers 25, a pair of slots 28 are concentrically formed on the gear 3 in a condition of free engagement with the bolts 5 which are utilized for fixing the eccentric 4 to the gear 3. Therefore, the relative fixing position of the eccentric 4 to the gear 3 can be easily changed by loosening the bolts 5 and changing the above-mentioned relative fixing position and, thereafter, fastening the bolts 5. Consequently, the timing between the action of the combing cylinder 27 and the detaching rollers 25 can be easily adjusted.

Figure 11:
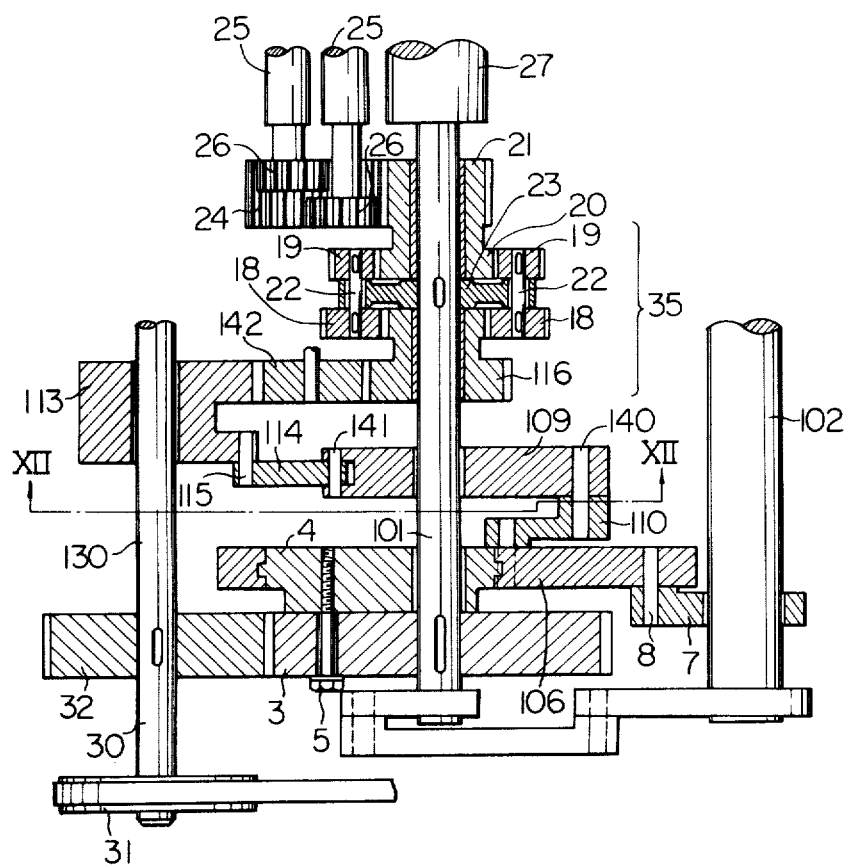
FIG. 11 is a sectional view of a modified apparatus for driving detaching rollers according to the present invention.

The driving apparatus shown in FIG. 11 is a modification of the apparatus shown in FIG. 1. That is, in this modified embodiment, the adjustment for changing the characteristic feature of the motion cycle created by the second link motion mechanism is carried out by changing the effective length of the control lever 109, instead of changing the effective length of the intermediate link 14 in the first embodiment. In this embodiment, a sector wheel 113, which corresponds to the sector wheel 13 of the first embodiment, is turnably mounted on the shaft 130, which corresponds to the shaft 30 of the first embodiment. A shaft 101, a shaft 102 a connecting link 110, an intermediate link 114, a control lever 109, a pivot shaft 115 and a sun gear 116 correspond to the shaft 1, the shaft 2, the connecting link 10, the intermediate link 14, the control lever 9, the pivot shaft 15 and the sun gear 16 of the first embodiment, respectively. Therefore the explanation related to these elements is omitted.

Figure 12:
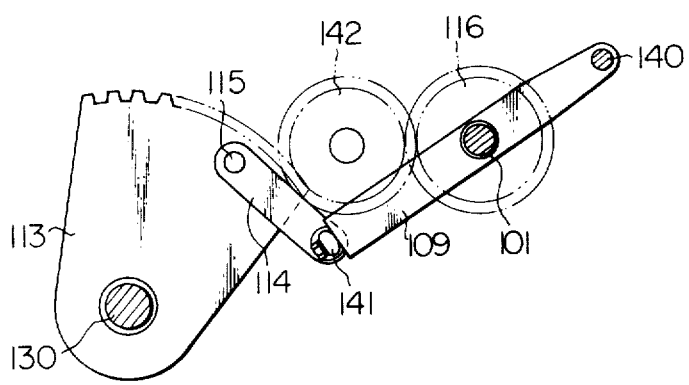
FIG. 12 is a sectional side view of the driving apparatus taken on line XII—XII in FIG. 11.
Figure 13:
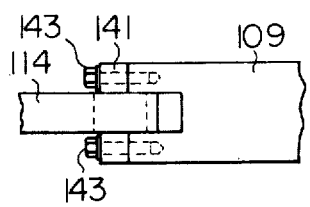
FIG. 13 is an elevational view of a part of the mechanism shown in FIG. 12.
Figure 14A:
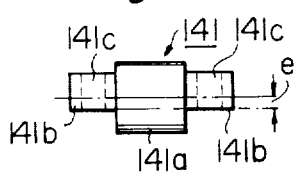
FIGS. 14A and 14B are shematic front views of the pin shown in FIG. 13.
Figure 14B:
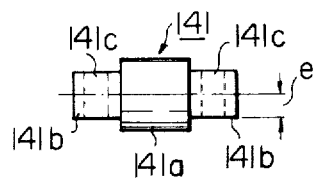
Figure 15:
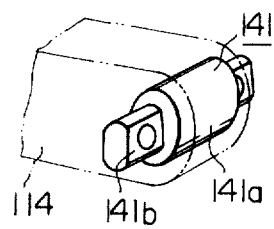
FIG. 15 is a schematic side view of the mechanism shown in FIG. 13.

As shown in FIGS. 11 and 12, the sun gear 116 is driven by the sector wheel 113 via an intermediate gear 142. The adjustment of the effective length of the control lever 109 can be easily made in precise condition in comparison with the case of changing the effective length of the intermediate link 14 in the first embodiment. In this embodiment, the control lever 109 is turnably mounted on a pivot shaft 140 which is turnably inserted into a receiving bore formed in the end portion of the connecting link 110, while the other end portion of the control lever 109 is turnably mounted on a pivot shaft 141 turnably held by an end portion of the intermediate link 114, as shown in FIGS. 11 and 12. The pivot shaft 141 comprises a cylindrical main portion 141a and eccentric portions 141b as shown in FIG. 14A. The main portion 141a is turnably inserted into the receiving bore formed in the end portion of the intermediate link 114 and the eccentric portions 141b are secured to a free end surface of the control lever 109. The edge of each of the portions 141b is biased from the axial center of the portion 141a to an extent e. The eccentric portions 141b are provided with a bore 141C, respectively, which permits free insertion of a fastening bolt 143 as shown in FIG. 13. After inserting the portion 141a of the pivot shaft 141 into the bore of the intermediate link 114 as shown in FIG. 15, the pivot shaft 141 is secured to an end portion of the control lever 109 by the fastening bolts 143 as shown in FIG. 13. The eccentricity represented by e of the pivot shaft 141 shown in FIG. 14B is larger than the pivot shaft 141 shown in FIG. 14A. Therefore, by utilizing the pivot shaft 141 having a suitable eccentricity, the effective length of the control shaft 109 can be easily changed. In the above-mentioned embodiments shown in FIGS. 1 and 11, a well-known crank mechanism or other mechanisms for creating reciprocal motion can be utilized instead of the eccentric 4. Further, instead of mounting the eccentric 4 and supporting lever 7, and the control lever 9 on the shafts 1 or 2, respectively, these elements may be mounted on the other shafts under in the basic technical idea of the present invention.

What is claimed is:

1. An apparatus for driving detaching rollers of a textile combing machine provided with a frame, a combing cylinder, a differential gear connected to said detaching rollers and a drive means connected to said differential gear for imparting a uniform rotary motion thereto, comprising a first link motion mechanism for creating a basic variable rotational motion cycle corresponding to a pilgrim step motion cycle of said detaching rollers in one complete rotation of said combing cylinder comprising a forward and rearward rotation thereof and a forward rotation thereof at a very slow speed and/or stopping rotation thereof, a second link motion mechanism for adjusting said basic motion cycle, said first link motion mechanism being driven by said drive means while said second link motion mechanism being driven by an output of said first link motion mechanism, an output of said second link motion mechanism being transmitted to said differential gear mechanism wherein said uniform rotary motion is superimposed with said output of said second link motion mechanism so that a predetermined pilgrim step motion cycle is imparted to said deteching rollers.

2. An apparatus for driving detaching rollers of a textile combing machine according to claim 1, further comprising a connecting link for transmitting said output of said first link motion mechanism to said second link motion mechanism.

3. An apparatus for driving detaching rollers of a textile combing machine according to claim 1, wherein said second link motion mechanism comprises a pair of shafts arranged in parallel condition, a control lever turnably mounted on one of said shafts, a swing member mounted on the other one of said shafts in swingable condition about control axis of said shaft, an intermediate link connecting said control lever and said swing member, a first pivot shaft connecting an end portion of said intermediate link and a free end portion of said control lever in relatively turnable condition about said first pivot pin, a second pivot shaft connecting the other end portion of said intermediate link and said swing member in relatively turnable condition about said second pivot shaft, said swing member connected to said differential gear mechanism for imparting an output of said second link motion mechanism to said differential gear mechanism.

4. An apparatus for driving detaching rollers of a textile combing machine according to claim 3, wherein said connecting link is turnably mounted on said pivot shaft at an end portion thereof.

5. An apparatus for driving detaching rollers of a textile combing machine according to claim 3, wherein said swing member is a sector wheel turnably mounted on said second shaft, said differential gear mechanism is provided with at least one sun gear, and said sector wheel meshes with said sun gear.

6. An apparatus for driving detaching rollers of a textile combing machine according to claim 3, wherein said first link motion mechanism comprises an eccentric driven by said drive means, a rocking arm turnably mounted on said eccentric about an eccentric outer surface of said eccentric, a supporting lever turnably mounted on said frame and pivotally connected to said rocking arm, the other end portion of said connecting link being pivotally connected to a portion of said rocking arm.

7. An apparatus for driving detaching rollers of a textile combing machine according to claim 6, wherein said connecting link is provided with an effective length thereof, between a pivotal center formed at each of the two end portions thereof, which coincides with a radius of curvature of a portion of an elliptical locus of a point on a straight line connecting a turning center of said eccentric and an axial center of said pivotal connection between said rocking arm and said supporting lever, said portion having a center of curvature.

8. An apparatus for driving detaching rollers of a textile combing machine according to claim 6, wherein said eccentric is mounted on a shaft of said combing cylinder in a condition of rotating together with said shaft of the combing cylinder and said control lever is turnably mounted on said shaft of the combing cylinder.

9. An apparatus for driving detaching rollers of a textile combing machine according to claim 8, wherein said drive means is provided with a power transmission shaft arranged in parallel condition to said shaft of the combing cylinder and said swing member is turnably mounted on said power transmission shaft.

* * * * *